United States Patent [19]

Prive

[11] 4,047,736
[45] Sept. 13, 1977

[54] VEHICLE SUSPENSION

[76] Inventor: Léonel Prive, 683 Sacre-Coeur Street, Alma, Lac St. Jean County, Quebec, Canada

[21] Appl. No.: 643,210

[22] Filed: Dec. 22, 1975

[30] Foreign Application Priority Data

Dec. 24, 1974 United Kingdom .................55,825

[51] Int. Cl.$^2$ ............................................ B60G 11/26
[52] U.S. Cl. .................................. 280/683; 267/64 A
[58] Field of Search ............... 280/104, 678, 683, 702, 280/709; 267/64 R, 64 A, 65 R

[56] References Cited

U.S. PATENT DOCUMENTS

| | | | |
|---|---|---|---|
| 2,914,338 | 11/1959 | Kress | 280/104 |
| 3,054,582 | 9/1962 | Lucien | 267/64 R |
| 3,112,923 | 12/1963 | Ley | 267/64 R |
| 3,295,623 | 1/1967 | Kyzer | 280/683 |
| 3,466,055 | 9/1969 | Keijzer | 280/708 |
| 3,740,070 | 6/1973 | Butler | 280/683 |
| 3,945,663 | 3/1976 | Duckett | 280/708 |

Primary Examiner—Robert R. Song
Assistant Examiner—John A. Carroll
Attorney, Agent, or Firm—Pierre Lesperance

[57] ABSTRACT

A vehicle suspension more particularly for three pairs of ground-engaging wheels at the back of a semi-trailer. The axle of each wheel is carried by the free end of a crank arm pivoted intermediate its ends to a support member secured to and projecting underneath the semi-trailer chassis. The other end of each crank arm is pivotally connected to the piston rod of a single-acting hydraulic cylinder and piston unit, the cylinder of which is pivotally connected to a support secured to the vehicle chassis. All the cylinders of the units on one side of the trailer chassis are interconnected by flexible hydraulic tubing. The set of units on one side of the semi-traler are not connected to the set of units on the other side of the trailer and the wheel axles on one side of the trailer are independent of the wheel axles on the other side of the trailer. A predetermined amount of hydraulic fluid fills the cylinders. When a wheel is raised or lowered with respect to the vehicle while riding over a hump or dropping into a recess of the road surface, there is a transfer of hydraulic fluid to the cylinders of the remaining wheels moving the same in the opposite direction. The hydraulic fluid can also compress an air bag located in a chamber in communication with the fluid circuit of the units so as to act as an air spring.

1 Claim, 4 Drawing Figures

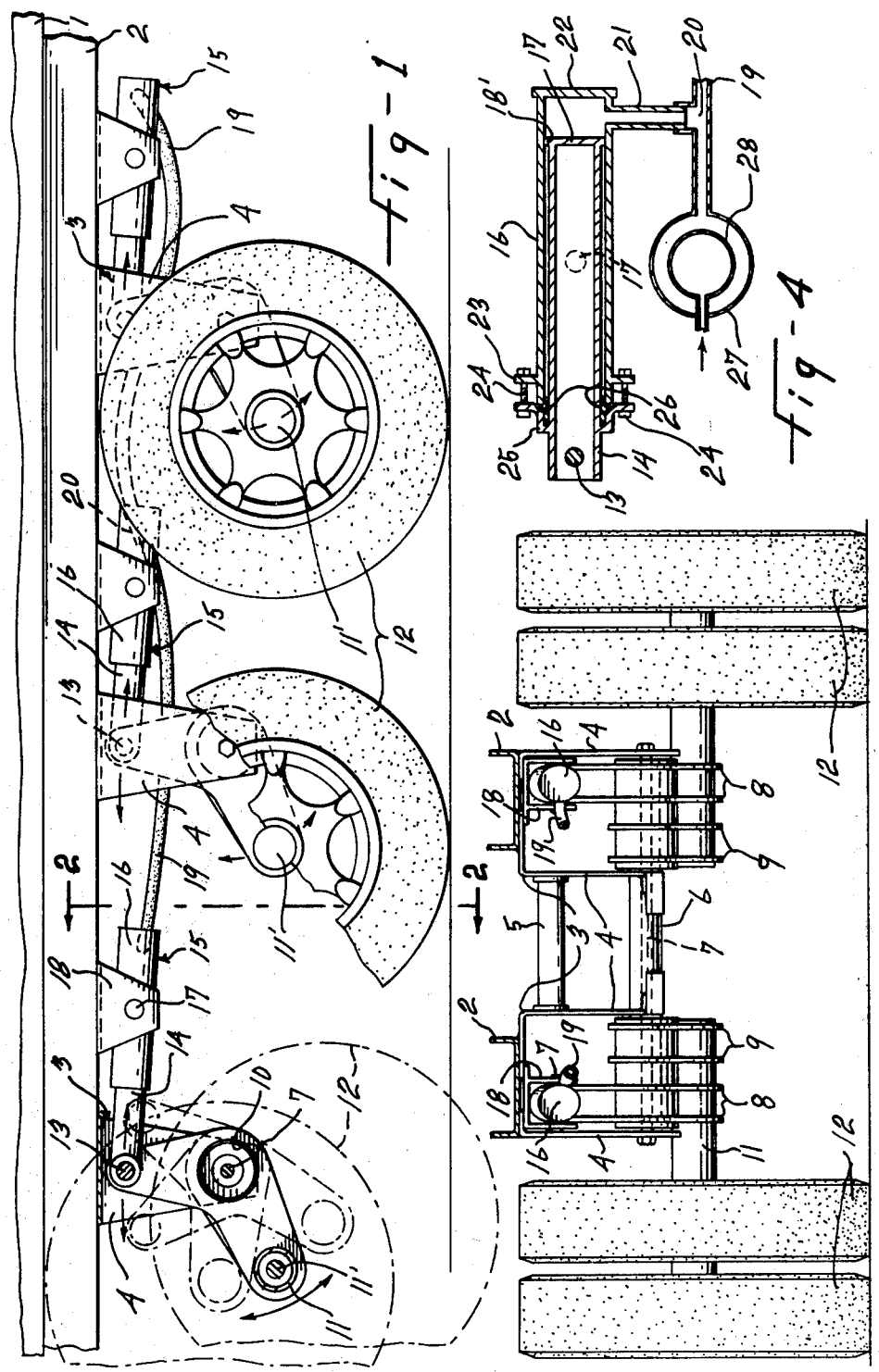

VEHICLE SUSPENSION

The present invention relates to a vehicle suspension, more particularly to a vehicle suspension of the hydraulic type for at least two pairs of ground-engaging wheels with the wheels of each pair located on both sides of the vehicle.

It is the main object of the present invention to provide a vehicle suspension of the character described, in which the load is automatically distributed substantially equally to all the wheels, even if the vehicle rides on a very rough road surface.

It is another object of the invention to provide a vehicle suspension of the character described in which the wheels riding over a hump automatically cause the remaining wheels to lower themselves with respect to the vehicle chassis, therefore providing a minimum of up-and-down movement of the vehicle chassis, even when the vehicle rides on a very bumpy surface.

Another object of the invention is to provide a vehicle suspension in which the wheels on one side of the vehicle are independently sprung with respect to the wheels on the other side of the vehicle, resulting in a smoother ride and greater lateral stability of the vehicle.

Another object of the invention is to provide a vehicle suspension of the character described, in which each wheel is associated with a hydraulic cylinder and piston unit and the units on anyone side of the vehicle are interconnected, the units contracting and elongating in accordance with the up-and-down movement of the associated wheel, so that contraction of one unit causes elongation of the other unit by the transfer of hydraulic fluid from one unit to the other; therefore, when one wheel lowers, the other wheels will raise, and vice versa.

Another object of the invention resides in the provision of a vehicle suspension of the character described, in which the hydraulic circuit on each side of the vehicle is connected to a chamber containing an air bag which is contracted by the hydraulic fluid, so as to serve as an air spring.

The foregoing and other objects of the present invention will become more apparent during the following disclosure and by referring to the drawings, in which:

FIG. 1 is a side elevation, partially cut away, of a semi-trailer provided with the suspension of the invention for three pairs of ground-engaging wheels;

FIG. 2 is a cross-section, taken along line 2—2 of FIG. 1;

FIG. 4 is a longitudinal section of one of the hydraulic cylinder and piston units with an associated air spring system.

In the drawings, like reference characters indicate like elements throughout.

Figure 3:
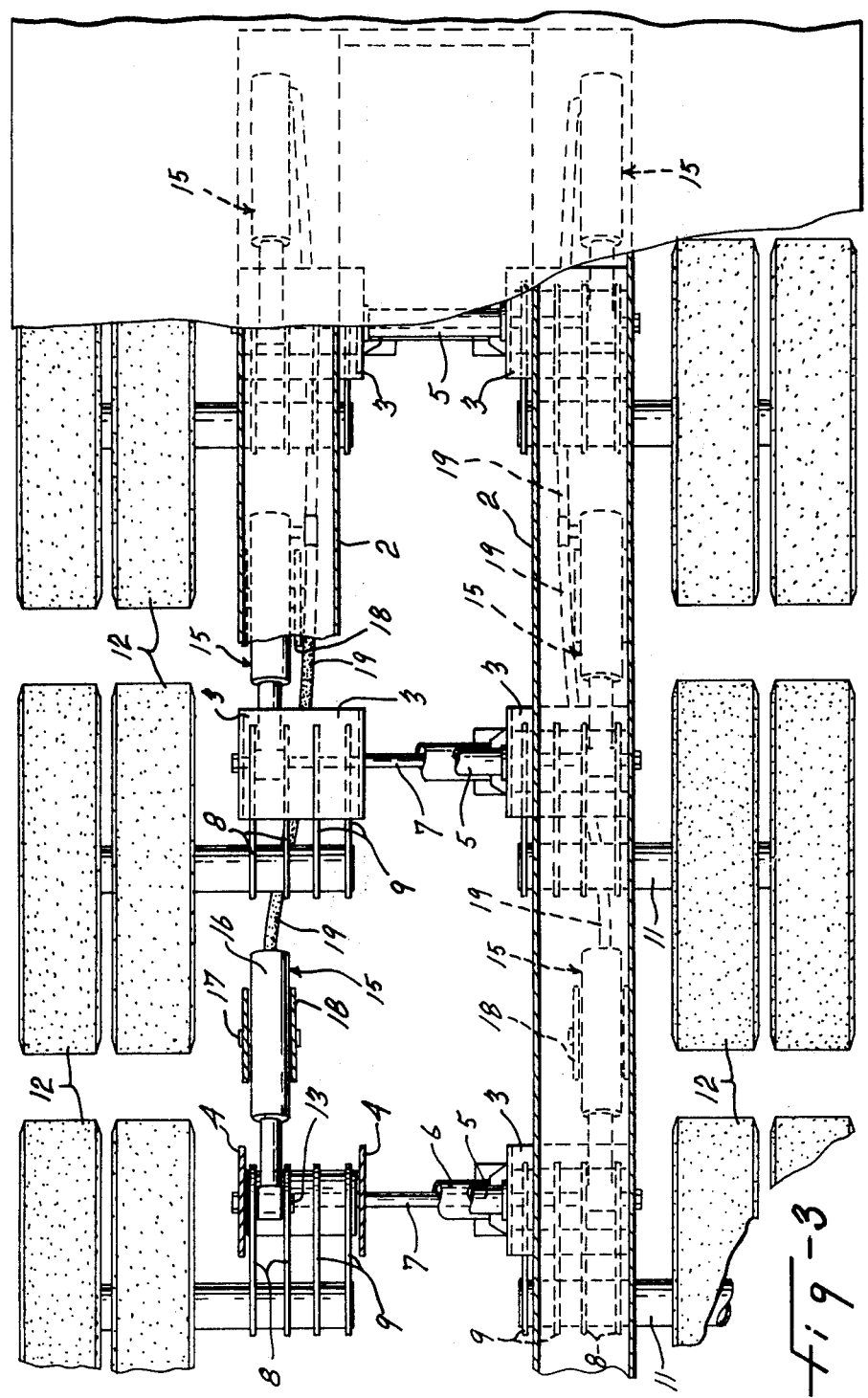
FIG. 3 is a top plan section, taken through the frame members and partially cut away to show underlying parts.

Reference numeral 1 indicates the longitudinally extending frame members of a vehicle chassis, more particularly at the back of a semi-trailer, and to the underside of which are secured longitudinally extending frame members 2 which can be in the shape of channels. There are two frame members 2: one for each side of the vehicle. To each channel 2 are secured three U-shaped brackets 3 longitudinally spaced along the member 2 and extending underneath the same with the legs 4 parallel and downwardly extending. The brackets 3 are disposed in pairs transversely of the vehicle. The brackets of each pair are rigidly interconnected by a spacer tube 5 interconnecting the tops of the inner legs 4 and a spacer tube 6 with a tie bolt 7 running through the spacer tube 6. Members 6 and 7 extend through both legs of each bracket 3 at the lower ends of said legs and serve as a pivot axle for a pair of crank arms 8 and a pair of further arms 9. The intermediate portions of the crank arms 8 and the ends of arms 9 surround and are mounted on a tubular shaft 10 which is rotatably journalled on tube 6. The free ends of arms 8 and 9 carry axle tube 11, in which is rotatably mounted the wheel axle 11' of the double groundengaging tire wheels 12, in a manner which is conventional. Thus, the wheel axles 11' of each pair of double wheels 12 are independent of each other, as clearly shown in FIG. 2.

The crank arms 8 have an L-shape when seen in side elevation, providing a first leg carrying wheel axle 11' at its outer end and a second leg, to the outer end of which is pivotally connected by means of a pin 13 the free end of a piston rod 14 of a hydraulic cylinder and piston unit, generally indicated at 15, and the cylinder 16 of which is surrounded intermediate its ends by a collar forming a pair of oppositely extending pivot pins 17 pivotally carried by a U-shaped bracket 18 secured underneath the longitudinal member 2. A line joining pivot connections 17 and 13 makes a small angle with the plane of the vehicle chassis. Each cylinder and piston unit 15 is single acting and the head of cylinder 16 of each unit is connected to the head of the cylinder 16 of the adjacent unit 15 by means of a flexible conduit 19 and coupling 20. As shown in FIG. 4, the piston rod 14 of each unit 15 is tubular, leaving a small annular space with the surrounding cylinder 16. The piston 17 is rigid with the piston rod and its periphery in contact with the inside wall of cylinder 16 has a plurality of notches 18' for the passage of fluid between the back and the front of the piston 17.

The connection 21 between the cylinder 16 and the conduit 19 is adjacent the closed end 22 of the cylinder 16. The open end of the cylinder 16 is provided with a collar 23, secured thereto, serving to retain by bolts and nuts 24 a removable collar 25 carrying a sealing bushing 26 in slidable contact with the piston rod 14. The suspension systems for all the wheel axles 11' are similar and the pivot axes 13, 17, and 10 are parallel to wheel axle 11'.

The hydraulic circuit formed by the three cylinders 16 of one set of cylinder and piston units 15 and the associated conduits 19 is also connected to a chamber 27 in which is located an air bag 28. The air bag 28 is of flexible and elastic material, such as rubber, and is filled with compressed air from a suitable compressed air supply, normally available on a truck or the like vehicle.

The vehicle suspension of the invention operates as follows:

A predetermined amount of hydraulic liquid, such as oil, fills the cylinders and the chamber 27 of each set of units 15 on each side of the semi-trailer and air, to a suitable pressure, fills the air bag 28. The amount of oil is such that the piston head 17 will be located approximately mid-way of the associated cylinder 16 for a normal load on the semi-trailer with the wheels on level ground. Each double wheel 12 can move up and down with respect to the vehicle chassis, causing contraction and elongation respectively of the associated cylinder and piston unit 15. Thus, when one wheel negotiates a bump on the road surface, it raises and the hydraulic liquid is expelled from its associated cylinder 16 and transferred to the two other cylinders of the sets of units 15, thereby positively causing lowering of the two remaining wheels. In a reverse manner, if one wheel encounters a recess or cavity in the road surface, it will lower and, consequently, the two remaining wheels will raise.

Because the units 15 are all identical and, more particularly, of the same cross-sectional size, the hydraulic pressure exerts equal force on each piston 17 and, therefore, the load distribution on the three pairs of wheels is substantially uniform and equal at all time. Because units 15 are nearly horizontal, any upward impact exerted by the wheels is transmitted to the chassis longitudinally of the latter and, therefore, the chassis is not caused to jump up. A semi-trailer has been provided with a prototype of the vehicle suspension of the invention. It has been found that the semi-trailer had very smooth riding characteristics, even on very rough road. In the prototype, the up-and-down stroke of the wheels was high, as 14" and 12" bumps were easily negotiable.

It is noted that the system is applicable to two pairs of wheels and more; with the prototype, three pairs of wheels were provided. Obviously, some of the wheels can be self-steering. There are no torsion forces on the wheel axles, because the same are independent for each pair of wheels. Lateral stability of the semi-trailer in a curve is very high when no air bag system is present and can be regulated by properly selecting the size of the air bag and enclosing chamber.

I claim:

1. A vehicle suspension for supporting an elongated vehicle chassis having a longitudinal axis on at least two pairs of ground-engaging wheels, each having a wheel axle, the wheels of each pair located on both sides of the vehicle, the wheel axles of said pairs disposed side by side transversely of the longitudinal axis of the vehicle, comprising a suspension system for each wheel axle, each of said suspension systems comprising a first support member secured to, and extending, underneath said vehicle chassis, an L-shaped crank arm having two legs making an acute angle therebetween pivoted to said first support member at the junction of said two legs about a first horizontal pivot axis, said wheel axle carried by the other end of one leg of said crank arm, the other leg of said crank arm upstanding from said first pivot axis, a second support member secured to, and extending, underneath said vehicle chassis, a hydraulic cylinder and piston unit having its cylinder pivotally carried by said second support member about a second pivot axis and having a piston rod pivotally connected to the outer end of said other leg of said crank arm about a third pivot axis, said first, second and third pivot axes being parallel to the wheel axle, the straight line connecting the second and third pivot axes making a small angle with the plane of the vehicle chassis, flexible conduit means interconnecting the head ends of the cylinders of all the cylinder and piston units on one side of the vehicle chassis, separate flexible conduit means connecting the head ends of the cylinders of all the cylinder and piston units on the other side of the vehicle chassis and independent of the flexible conduit means on the first-named side of the vehicle chassis, all the wheel axles on one side of the vehicle chassis being independent of the wheel axles on the other side of the vehicle chassis, upward movement of a wheel axle on one side of the vehicle chassis causing retracting movement of the cylinder rod of the associated cylinder and piston unit and transfer of the hydraulic fluid from said last-named unit to the head end of the cylinders of all the other units on the same side of the vehicle chassis and consequent movement of the piston rods of said other units and consequent lowering of the wheel axles associated with said other units, any upward impact exerted by the wheels being transmitted to the vehicle chassis longitudinally of the latter by the force transmitted through the cylinder piston unit along its longitudinal axis.

* * * * *